June 13, 1967 H. S. LINDAHL ET AL 3,324,673

REFRIGERATION SYSTEM WITH CHECK VALVE

Filed July 19, 1965

INVENTORS
HERBERT S. LINDAHL
JAY F. FALKE
BY *Whittemore,*
*Hulbert & Belknap*
ATTORNEYS United States Patent Office 3,324,673
Patented June 13, 1967

3,324,673
REFRIGERATION SYSTEM WITH CHECK VALVE
Herbert S. Lindahl and Jay F. Falke, Danville, Ill., assignors to Universal American Corporation, New York, N.Y., a corporation of Delaware
Filed July 19, 1965, Ser. No. 472,898
13 Claims. (Cl. 62—196)

The invention relates to check valves and refers more specifically to a spring loaded check valve for use in a refrigeration system or the like which will not chatter when subjected to pulsations of gas as, for example, from the compressor in a refrigeration system.

In refrigeration systems, it is often necessary to restrict flow of refrigerant gas through a spring loaded check valve until the pressure at the valve inlet port is somewhat greater than at the outlet port. The differential in pressure may be from two to fifteen pounds per square inch or greater and is normally controlled by the valve spring which is designed to compress at a predetermined working pressure.

The usual spring loaded check valve when subjected to pulsations of gas from the refrigeration system compressor will chatter violently. The chattering is most pronounced when a low flow of gas is required to satisfy the pressure differential set between the inlet and the outlet ports. The chattering is produced when the valve plug is raised a short distance to open the valve and then slammed against the seat at the frequency of the pulsations of the gas flowing through the valve. The usual valve plug may also vibrate against the valve housing wall due to operating tolerances required between the usual metal valve housing and valve plug to prevent seizing thereof on changes in temperature.

It is therefore one of the objects of the present invention to provide improved check valve structure.

Another object is to provide check valve structure which will not chatter when subjected to a pulsating flow of gas.

Another object is to provide check valve structure wherein the valve housing and plug are constructed and arranged to require a substantial lifting of the valve plug from its seat before the valve is open.

Another object is to provide a check valve wherein the plug has a minimum contact area with the valve housing and valve seat.

Another object is to provide check valve structure which allows escape of gas from behind the valve plug on opening of the valve until the valve plug is in a fully open position.

Another object is to provide a check valve having a plastic valve plug with no tolerance between the valve plug and housing.

Another object is to provide a refrigeration system including refrigerant receiver, an expansion valve, an evaporator, a compressor and a condenser connected in a closed refrigeration cycle and further including a valve for restricting the connection between the condenser and receiver in response to a refrigeration operating parameter and a bypass line between the compressor and receiver including a check valve therein for connecting the compressor directly to the receiver to maintain receiver pressure on refrigeration system start-up which check valve is constructed and arranged to prevent chattering due to pulsations in the compressor refrigerant gas passed therethrough.

Another object is to provide a check valve as set forth above which is simple in construction, economical to manufacture and efficient in use.

Other objects and features of the invention will become apparent as the description proceeds, especially when taken in conjunction with the accompanying drawing, illustrating a preferred embodiment of the invention, wherein.

Figure 1:
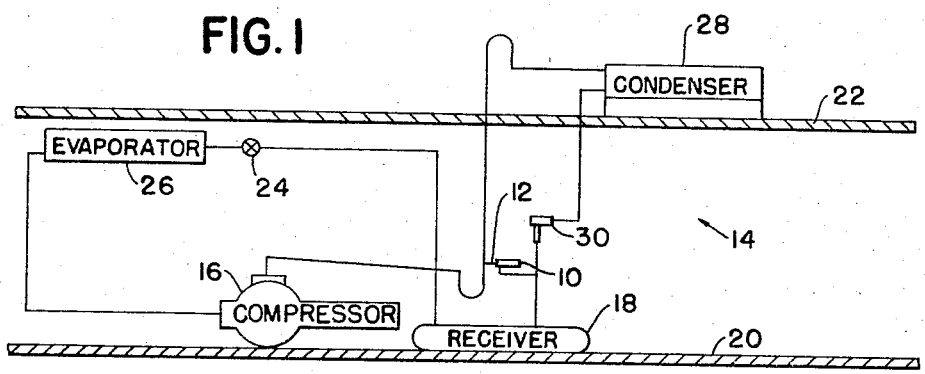
FIGURE 1 is a diagrammatic representation of a refrigeration system including a check valve therein constructed in accordance with the invention.

With particular reference to the figures of the drawing, one embodiment of the present invention will now be considered in detail.

Figure 2:
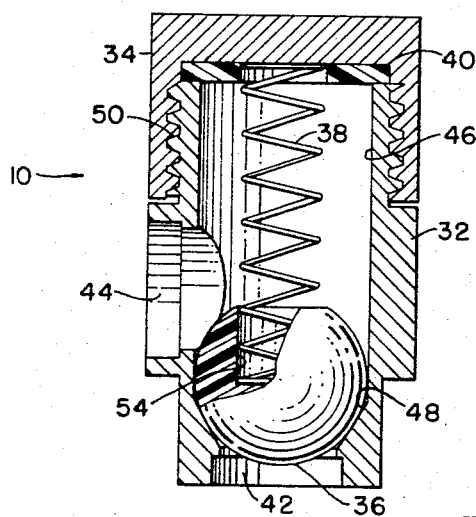
FIGURE 2 is an enlarged longitudinal section view of the check valve illustrated in FIGURE 1.
Figure 3:
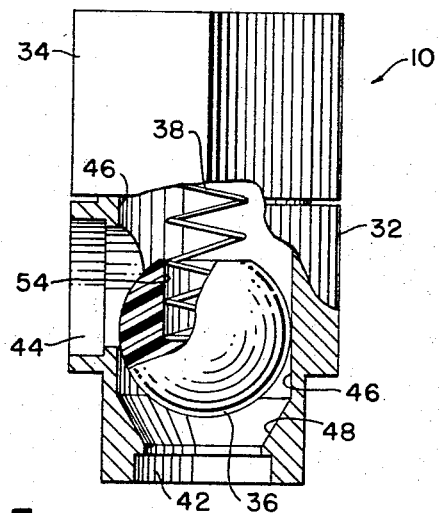
FIGURE 3 is a partially broken away elevation view of the check valve illustrated in FIGURE 2 showing the valve in a partially open position.

As shown in FIGURE 1, a check valve 10 constructed in accordance with the invention is provided in a bypass line 12 of refrigeration system 14 between the compressor 16 and receiver 18. The check valve, as shown best in FIGURES 2 and 3, is constructed and arranged to prevent chattering thereof on pulsations in gas pressure from the compressor 16 during operation of the check valve to bypass compressor gas directly to the receiver.

More specifically the refrigeration system illustrated in FIGURE 1 is by way of example positioned between two floors 20 and 22 of a multi-story building. The refrigeration system includes the receiver 18, an expansion valve 24, an evaporator 26, compressor 16, condenser 28 and pressure regulating valve 30 connected in a closed refrigeration cycle. The bypass line 12 with the check valve 10 therein is connected between the output of compressor 16 and the input of receiver 18.

In operation of the refrigeration system 14 refrigerant from receiver 18 passes through the expansion valve 24 and is evaporated in the evaporator 26 to provide cooling. The refrigerating gas is then compressed by the compressor 16. The compressed refrigerating gas is then passed to the condenser 28 where it is condensed and returned to the receiver 18 through the pressure regulating valve 30.

Such refrigeration systems are well know and are normally designed to operate at a predetermined summer temperature. With such systems using an air cooled condenser, as the ambient temperature drops, the condenser capacity increases producing a drop in the operating pressure head at the condenser and receiver which during winter operation, for example, may seriously impede the refrigerating cycle since insufficient refrigerant will be passed from the receiver to the expansion valve 24 at low receiver pressure. At this time the constant pressure regulating valve 30 is effected to restrict the line between the condenser and the receiver until a portion of the condenser becomes flooded and therefore useless as a condenser to reestablish the desired pressure head in the condenser 28. As regulating valve 30 restricts the line between the condenser and the receiver, the receiver pressure head would be considerably reduced except that check valve 10 in bypass line 12 opens allowing compressor pressure to pass directly to receiver 18 and thereby maintains desired pressure head in the receiver 18 slightly below that of the controlled pressure head in condenser 28. The pressure head difference between the condenser 28 and receiver 18 is equal to the pressure difference required to open check valve 10 and is predetermined by the strength of the spring inserted in check valve 10.

On system start-up in the winter, however, it will be seen that receiver pressure 18 will be considerably reduced due to the restriction of the pressure regulating valve 30 until sufficient head is built up in the condenser to establish the required receiver operating pressure. To prevent short cycling of the refrigeration system during the start-up period, the bypass line 12 is provided so that the compressor pressure is passed directly to the receiver 18 through the bypass line 12 to maintain the receiver pressure at a value to prevent short cycling of the refrigeration system during winter start-ups. The check valve 10 also prevents migration of refrigerant to the condenser during the off cycle of the refrigeration system.

The check valve 10, as best illustrated in FIGURES 2 and 3, includes a valve housing 32, a cap 34, valve plug 36, spring 38 and sealing washer 40.

The housing 32 is provided with a valve inlet port 42 at the lower end thereof, as shown in FIGURES 2 and 3, and a valve outlet port 44 in the side thereof. The valve housing 32 includes a cylindrical valve plug chamber 46 in the upper end thereof and a conical valve seat 48 in the lower end thereof.

The upper end of the housing 32 is provided with threads 50 and receives the cap 34 which is provided with internal threads, as shown in FIGURE 2. The washer 40 is positioned on the upper end of the housing 32 and provides the dual function of centering the upper end of the spring 38 and sealing the connection between the housing 32 and cap 34. The cap 34, as indicated best in FIGURE 3, is provided with a rectangular outer surface as is the central portion of the housing member 32 to facilitate assembly and disassembly thereof.

The valve plug 36, as shown in FIGURES 2 and 3, is a spherical plastic member having a recess 54 therein in which the lower end of the spring 38 is received. The spring 38 thus forces the valve plug 36 into contact with the valve seat 48 and establishes an operating bias for the check valve 10. The pressure differential between the input and outlet ports 42 and 44 of the check valve 10 must be sufficient to overcome the force of the spring 38 before the valve plug 36 will be raised from the valve seat 48.

The valve housing 32 is constructed with a distance between the inlet port 42 and the outlet port 44 so that the valve plug 36 must rise a distance, as shown in FIGURE 3, from the seated position thereof illustrated in FIGURE 2 before the check valve 10 will allow the refrigerant to pass therethrough. Thus chattering of the valve 10 due to slamming of the valve plug 36 onto the valve seat 48 as the result of rapid pulsations in the refrigerant gas received from the compressor 16 is prevented, since due to the distance the valve plug 36 must travel to be seated on the seat 48 on occurrence of a low pressure portion of a pulsating signal between the inlet port 42 and the outlet port 44 before the valve plug can be seated a high pressure will again be present at the inlet port 42 to prevent seating of the valve plug 36. The valve plug 36 is thus caused to reciprocate axially of the cylindrical chamber 46 without seating on the seat 48 due to pulsations in the gas received by check valve 10.

Since the valve plug 36 is spherical, as shown in FIGURES 2 and 3, gas in the upper end of the housing chamber 46 will be permitted to escape into the outlet port 44 around the valve plug 36 until the valve plug 36 is fully open. Also, the spherical form of the valve plug 36 will prevent loss of seal of the valve plug 36 due to rotation thereof in the chamber 46. The spherical structure of the valve plug 36 further provides minimum contact area between the valve plug 36 and the walls of the chamber 46 in valve housing 32, as well as minimum contact of the valve plug 36 with the valve seat 48.

In addition, as previously indicated, the valve plug 36 is constructed of plastic, such as polytetrafluoroethylene, commonly known as Teflon, which has a low coefficient of expansion and a slippery surface. The Teflon is a resilient material which will expand some with heat and when in contact with refrigerants.

The plug 36 is provided without tolerance in the chamber 46 and on swelling of the plug it will make sealing contact with the walls of chamber 46 without excessive drag due to friction since the expansion of the plug 36 is aided by the spherical shape thereof which provides space immediately adjacent the contact area between the plug 36 and wall of chamber 46 into which the resilient Teflon will expand to relieve excessive pressures between the plug and the chamber wall.

In addition the Teflon valve plug is not subject to the usual corrosion of valve plugs. Further, due to the minimum contact between the valve housing and the spherical plug the plug 36 is not subject to seizing in the chamber 46 in the manner of a metal plug on corrosion thereof or variable expansion between the plug and housing.

Thus, in operation of the refrigeration system 14, illustrated in FIGURE 1, on system start-up in cold weather, refrigerant from the compressor will be passed through the check valve to receiver 18 to maintain pressure therein when the pressure difference between the compressor outlet and receiver inlet is sufficient to overcome the spring 38 so that the valve plug 36 will be raised as illustrated in FIGURE 3. No compressor gas can accumulate between the plug 36 and the upper end of the chamber 46, as shown in FIGURE 2, to prevent full opening of the valve 10 if the pressure differential requires full opening.

On pulsation of the compressor gas, the valve plug 36 will not chatter due to slamming of the valve plug on the valve seat 48 due to the large movement which must be made by the valve plug between the position at which opening occurs as in FIGURE 3 and the seated position illustrated in FIG. 2 and the time required for the valve to travel the distance between the position illustrated in FIGURE 3 and the position illustrated in FIGURE 2 as compared to the frequency of the pulsations of the refrigerating gas applied to the valve 10.

Should the valve plug 36 become heated or expand due to contact with the refrigerant, due to the spherical nature of the valve plug 36, the small area of contact with the chamber 46 and the plastic nature of the valve plug, the valve plug will expand axially of the chamber 46 and the resulting contact area wtih the chamber 46 will not provide excessive drag on the valve plug.

Figure 4:
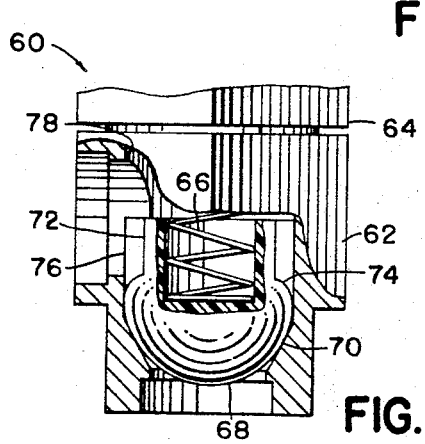
FIGURE 4 is a partially broken away partial elevation view of a modified check valve constructed in accordance with the invention.

The modified check valve structure 60 illustrated in FIGURE 4 includes a housing member 62, a cap 64 and a spring 66 entirely similar to the housing member, cap and spring of the valve structure 10. The valve plug 68 is however provided with a hemispherical right end portion 70, a cylindrical left end portion 72 and an annular transitional portion 74 extending therebetween, as shown in FIGURE 4. In addition fins 76 of relatively short circumferential extent with respect to the cylindrical part 72 of the valve plug 68 are provided extending axially of the cylindrical part 72. The fins 76 extend radially to the outer diameter of the spherical part 70 of the plug 68.

Thus, with the valve plug 68, as shown in FIGURE 4, the plug 68 is guided in axial movement within the valve plug chamber 78 and is held against rotation about an axis extending perpendicular to FIGURE 4 outwardly of the drawing and through the center of generation of the hemispherical portion 70 of the plug 68. At the same time the gas which may be in the upper end of the chamber 78 is permitted to escape until the valve plug 68 is in a fully open position.

Figure 5:
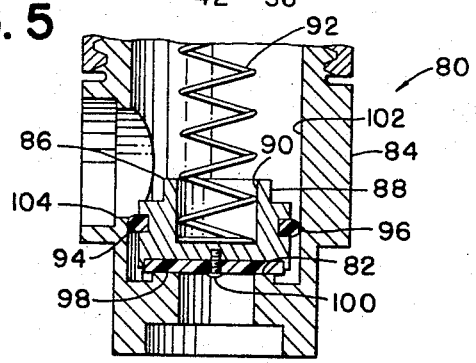
FIGURE 5 is a partial longitudinal section view of another modified check valve constructed in accordance with the invention.

The modified check valve structure 80 illustrated in FIGURE 5 is exactly the same as the check valve structure of FIGURES 1–3 with the exception of the valve plug 86 and the valve seat 82 in the valve body 84 which is flat and annular instead of conical. The valve plug 86 includes the generally cylindrical metal body member 88 having the internal recess 90 therein into which the spring 92 extends for urging the valve plug 86 toward the valve seat 82. The valve plug 86 further includes the exterior annular groove 94 therein in which the annular plastic sealing ring 96 is positioned. The plastic sealing member 98 is secured to the lower end of the plug 86 by convenient means, such as the screw 100.

In operation the plug 86 may be guided in reciprocal movement within the body member 84 by means of the spring 92 or by fins on the plug 86, similar to fins 76, which fins are not shown. Again, no clearance is provided between the plastic sealing ring 96 and the inner surface 102 of the body member 84, the sealing ring 96 is positioned below the valve outlet opening 104 sufficient to require movement of the valve plug 86 a predetermined distance before the check valve is opened, whereby the valve plug 86 is caused to oscillate off of the valve seat 82 due to rapid small fluctuations in the material passing through the valve structure 80 and the valve plug is so constructed that the medium flowing through the valve structure will not be trapped behind the valve plug 86.

While one embodiment and a modification of the present invention have been disclosed in detail, it will be understood that other embodiments and modifications as well as other applications are contemplated. It is the intention to include all embodiments, modifications and applications as are encompassed by the appended claims within the scope of the invention.

What we claim as our invention is:

1. A refrigeration system including a receiver for refrigerant, an expansion valve, an evaporator, a compressor and a condenser connected in series in a closed refrigeration system, a pressure regulated valve positioned between the condenser and receiver for regulated flooding of the condenser, a bypass line between the compressor and receiver for bypassing refrigerant from the compressor output to the receiver to maintain pressure in the receiver and a check valve in the bypass line including a hollow valve housing having spaced apart inlet and outlet ports, a valve seat adjacent the inlet port and a valve plug means having plastic portions in sealing relation with the interior of the hollow valve housing beween the inlet and outlet ports over a minimum area, said valve plug means movable in sealing relation between the inlet and outlet ports over a substantial distance from the valve seat before passing the outlet port to open said valve and resilient means urging the valve plug into sealing relation on the valve seat.

2. Structure as set forth in claim 1 wherein the valve plug is constructed entirely of plastic.

3. Structure as set forth in claim 1 wherein the valve plug is of metal with plastic surfaces for contacting the valve housing between the inlet and outlet ports and for contacting the valve seat.

4. Structure as set forth in claim 1 wherein the valve plug is spherical.

5. Structure as set forth in claim 1 wherein the valve plug has a hemispherical portion adjacent the valve seat, a cylindrical portion adjacent the outlet port and radially and longitudinally extending fins on the cylindrical portion for guiding the movement of the valve plug within the valve housing.

6. Structure as set forth in claim 1 wherein the valve seat is substantially flat and the valve plug has a substantially flat portion adjacent the valve seat.

7. A refrigeration system including a receiver for refrigerant, an expansion valve, an evaporator, a compressor and a condenser connected in series in a closed refrigeration system, a pressure regulated valve positioned between the condenser and receiver for regulated flooding of the condenser, a bypass line between the compressor and receiver for bypassing refrigerant from the compressor output to the receiver to maintain pressure in the receiver and a check valve in the bypass line comprising a hollow valve housing having an inlet and outlet port, a valve seat adjacent the inlet port and a plastic valve plug movable within the valve housing into and out of seating position on the valve seat and sealing position between the inlet and outlet ports including a hemispherical portion adjacent the valve seat, a cylindrical portion adjacent the outlet port and radially and longitudinally extending fins on the cylindrical portion for guiding the movement of the valve plug within the valve housing.

8. A check valve for use in refrigeration systems or the like comprising a hollow valve housing having spaced apart inlet and outlet ports, a valve seat adjacent the inlet port and a valve plug means having plastic portions in sealing relation with the interior of the hollow valve housing between the inlet and outlet ports over a minimum area, said valve plug means movable in sealing relation between the inlet and outlet ports over a substantial distance from the valve seat before passing the outlet port to open said valve and resilient means urging the valve plug into sealing position on the valve seat.

9. Structure as set forth in claim 8 wherein the valve plug is constructed entirely of plastic.

10. Structure as set forth in claim 8 wherein the valve plug is of metal with plastic surfaces for contacting the valve housing between the inlet and outlet ports and for contacting the valve seat.

11. Structure as set forth in claim 8 wherein the valve plug is spherical.

12. Structure as set forth in claim 8 wherein the valve plug has a hemispherical portion adjacent the valve seat, a cylindrical portion adjacent the outlet port and radially and longitudinally extending fins on the cylindrical portion for guiding the movement of the valve plug within the valve housing.

13. Structure as set forth in claim 8 wherein the valve seat is substantially flat and the valve plug has a substantially flat portion adjacent the valve seat.

References Cited
UNITED STATES PATENTS

| | | | |
|---|---|---|---|
| 2,375,498 | 5/1945 | Seymour | 137—539 X |
| 2,874,550 | 2/1959 | Musson. | |
| 2,966,164 | 12/1960 | Britton | 137—543.2 X |
| 2,973,008 | 2/1961 | Klose | 251—368 X |
| 3,195,319 | 7/1965 | Wolff. | |

MEYER PERLIN, *Primary Examiner.*